(12) United States Patent
Berghuis et al.

(10) Patent No.: US 12,477,626 B2
(45) Date of Patent: Nov. 18, 2025

(54) METHODS FOR POWER CYCLE SELECTION IN APPLIANCES

(71) Applicant: Haier US Appliance Solutions, Inc., Wilmington, DE (US)

(72) Inventors: Catherine Berghuis, Louisville, KY (US); Omar Santana, Louisville, KY (US); Manav Patel, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 639 days.

(21) Appl. No.: 17/879,184

(22) Filed: Aug. 2, 2022

(65) Prior Publication Data
US 2024/0049369 A1 Feb. 8, 2024

(51) Int. Cl.
*H05B 1/02* (2006.01)
(52) U.S. Cl.
CPC ....... *H05B 1/0266* (2013.01); *H05B 2213/07* (2013.01)
(58) Field of Classification Search
None
See application file for complete search history.

(56) References Cited

U.S. PATENT DOCUMENTS

| | | | |
|---|---|---|---|
| 7,420,140 B2 | 9/2008 | Lenhart, Jr. et al. | |
| 7,589,299 B2 | 9/2009 | Fisher et al. | |
| 8,102,080 B2 | 1/2012 | Fonseca et al. | |
| 10,260,755 B2 | 4/2019 | Bach | |
| 10,584,882 B2 | 3/2020 | Iordanoglou | |
| 2002/0088794 A1 | 7/2002 | Nelson et al. | |
| 2018/0010805 A1* | 1/2018 | Bach | F24C 7/087 |
| 2018/0224127 A1* | 8/2018 | Lambert | H05B 1/0266 |
| 2018/0245796 A1* | 8/2018 | Iordanoglou | H05B 3/746 |
| 2018/0271322 A1* | 9/2018 | Thai | A47J 27/21083 |
| 2019/0261465 A1 | 8/2019 | Meng et al. | |

FOREIGN PATENT DOCUMENTS

| | | | | |
|---|---|---|---|---|
| AU | 2007231697 B2 | 5/2008 | | |
| DE | 102017220963 A1 * | 6/2018 | ............ | F24C 15/102 |

OTHER PUBLICATIONS

Translation of DE-102017220963-A1 (Year: 2018).*

* cited by examiner

*Primary Examiner* — Elizabeth M Kerr
(74) *Attorney, Agent, or Firm* — Dority & Manning, P.A.

(57) ABSTRACT

A method of closed loop cooking on an appliance includes monitoring, by a controller, a temperature measurement from a sensor indicative of a cooking temperature during a cooking operation. Comparing, by the controller, the temperature measurement to a set temperature of the cooking operation. Determining, by the controller, a heating event defined by the temperature measurement. Adjusting, by the controller, a cycle period time for a heating element. The cycle period time is associated with the heating event.

19 Claims, 8 Drawing Sheets

| MAXIMUM TEMPERATURE ERROR ($E_{MAX}$) [C] | RECOVERY SLOPE (RS) [C/sec] | FOOD TYPE | POWER CYCLE PERIOD ($P_{PC}$) [sec] |
|---|---|---|---|
| 20-30 (TEMPERATURE BAND 1) | UNDER 0.10 | 1 | 30 |
| | 0.10-0.20 | 2 | 20 |
| | OVER 0.20 | 3 | 10 |
| 31-40 (TEMPERATURE BAND 2) | UNDER 0.15 | 1 | 30 |
| | 0.15-0.30 | 2 | 20 |
| | OVER 0.30 | 3 | 10 |
| 41-50 (TEMPERATURE BAND 3) | UNDER 0.20 | 1 | 30 |
| | 0.20-0.40 | 2 | 20 |
| | OVER 0.40 | 3 | 10 |
| 51+ (TEMPERATURE BAND 4) | UNDER 0.30 | 1 | 30 |
| | 0.30-0.55 | 2 | 20 |
| | OVER 0.55 | 3 | 10 |

FIG. 7

| MINIMUM TEMPERATURE VALUE ($T_{MIN}$)[C] | MAXIMUM TEMPERATURE ERROR ($E_{MAX}$)[C] | RECOVERY SLOPE (RS) [C/sec] | FOOD TYPE | POWER CYCLE PERIOD ($P_{PC}$) [sec] |
|---|---|---|---|---|
| 90-125 | 20-30 (TEMPERATURE BAND 1) | UNDER 0.10 | 1 | 30 |
| | | 0.10-0.20 | 2 | 20 |
| | | OVER 0.20 | 3 | 10 |
| | 31-40 (TEMPERATURE BAND 2) | UNDER 0.15 | 1 | 30 |
| | | 0.15-0.30 | 2 | 20 |
| | | OVER 0.30 | 3 | 10 |
| | 41-50 (TEMPERATURE BAND 3) | UNDER 0.20 | 1 | 30 |
| | | 0.20-0.40 | 2 | 20 |
| | | OVER 0.40 | 3 | 10 |
| | 51+ (TEMPERATURE BAND 4) | UNDER 0.30 | 1 | 30 |
| | | 0.30-0.55 | 2 | 20 |
| | | OVER 0.55 | 3 | 10 |
| 126-160 | … | … | … | … |
| … | | | | |
| 231-265 | … | … | … | … |

FIG. 8

METHODS FOR POWER CYCLE SELECTION IN APPLIANCES

FIELD OF THE INVENTION

The present subject matter relates generally to methods for selecting the power cycle in appliances.

BACKGROUND OF THE INVENTION

Closed loop cooking (CLC or Precision Cooking) on cooking appliances is a feedback system to measure a variable and control the appliance based on the error between the variable setpoint and the variable's current value. During CLC, the power to the cooking element is cycled on and off during operation depending on the amount of heating power needed to achieve and maintain the variable setpoint. Typically, the power is controlled with a predefined frequency or period. During this cycling period, the ratio of the on time versus the total time is changed to produce different power levels. This ratio is frequently called the duty cycle. Whenever the cooking algorithm calls for a change in power level, the duty cycle is changed to adjust the average power being applied to the cooking element.

Conventionally, the power is controlled with a fixed cycle period and the duty cycle is changed. However, since the cycle time is conventionally fixed, the appliance system cannot adjust appropriately and rapidly in all situations. A method to select an appropriate cycle period would be advantageous.

BRIEF DESCRIPTION OF THE INVENTION

Aspects and advantages of the invention will be set forth in part in the following description, or may be apparent from the description, or may be learned through practice of the invention.

In one example embodiment, a method of closed loop cooking on an appliance includes monitoring, by a controller, a temperature measurement from a sensor indicative of a cooking temperature during a cooking operation. Comparing, by the controller, the temperature measurement to a set temperature of the cooking operation. Determining, by the controller, a heating event defined by the temperature measurement. Adjusting, by the controller, a cycle period time for a heating element. The cycle period time is associated with the heating event.

In another example embodiment, a method of cycle period adjustment on an appliance includes monitoring, by a controller, a temperature measurement from a sensor indicative of a cooking temperature during a cooking operation. Comparing, by the controller, the temperature measurement to a set temperature of the cooking operation. Determining, by the controller, a heating event defined by the temperature measurement. Identifying, by the controller, a cooking event associated with the heating event. Calculating, by the controller, recovery period parameters after the heating event. The recovery period parameters include a rate of recovery, a current power level of the appliance, a set of controller gains, a temperature measurement, a temperature error when the recovery period starts, a quantity of food, a type of food, and a material of a cooking utensil. The rate of recovery is determined by a difference in the temperature measurement over time. Adjusting, by the controller, a cycle period time for a heating element in response to the calculated recovery period parameters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 7 is an example table of values shown in the plot of FIG. 6.

FIG. 8 is an example table of values in accordance with an example embodiment of the present subject matter.

Figure 1:
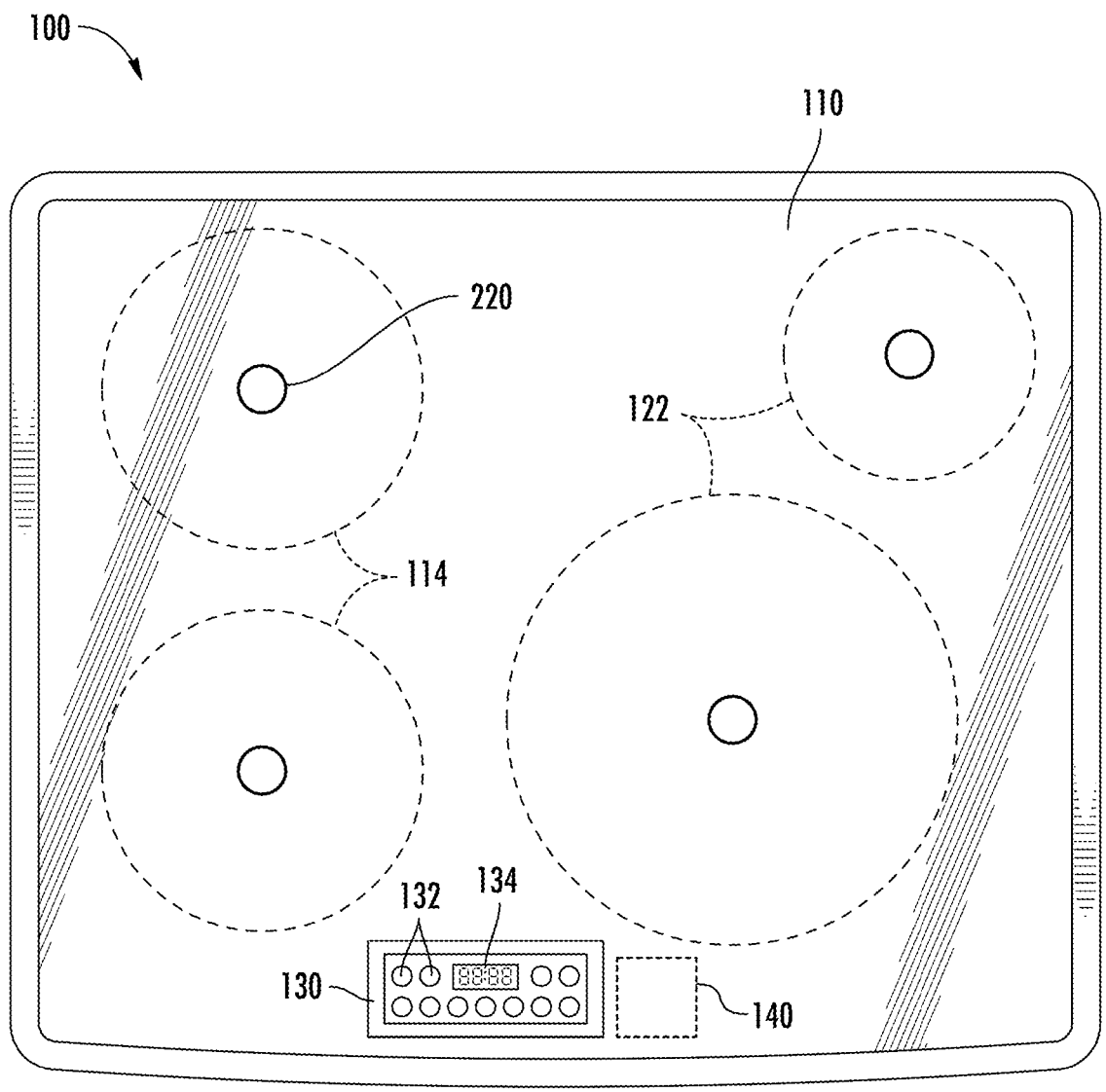
FIG. 1 provides a top, plan view of a cooktop appliance in accordance with an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin. Similarly, a state of operation modified by the term "semi-cycle" is not meant to be limited to exactly half of a cycle, as the "semi-cycle" may be more or less than half of the cycle.

Figure 2:
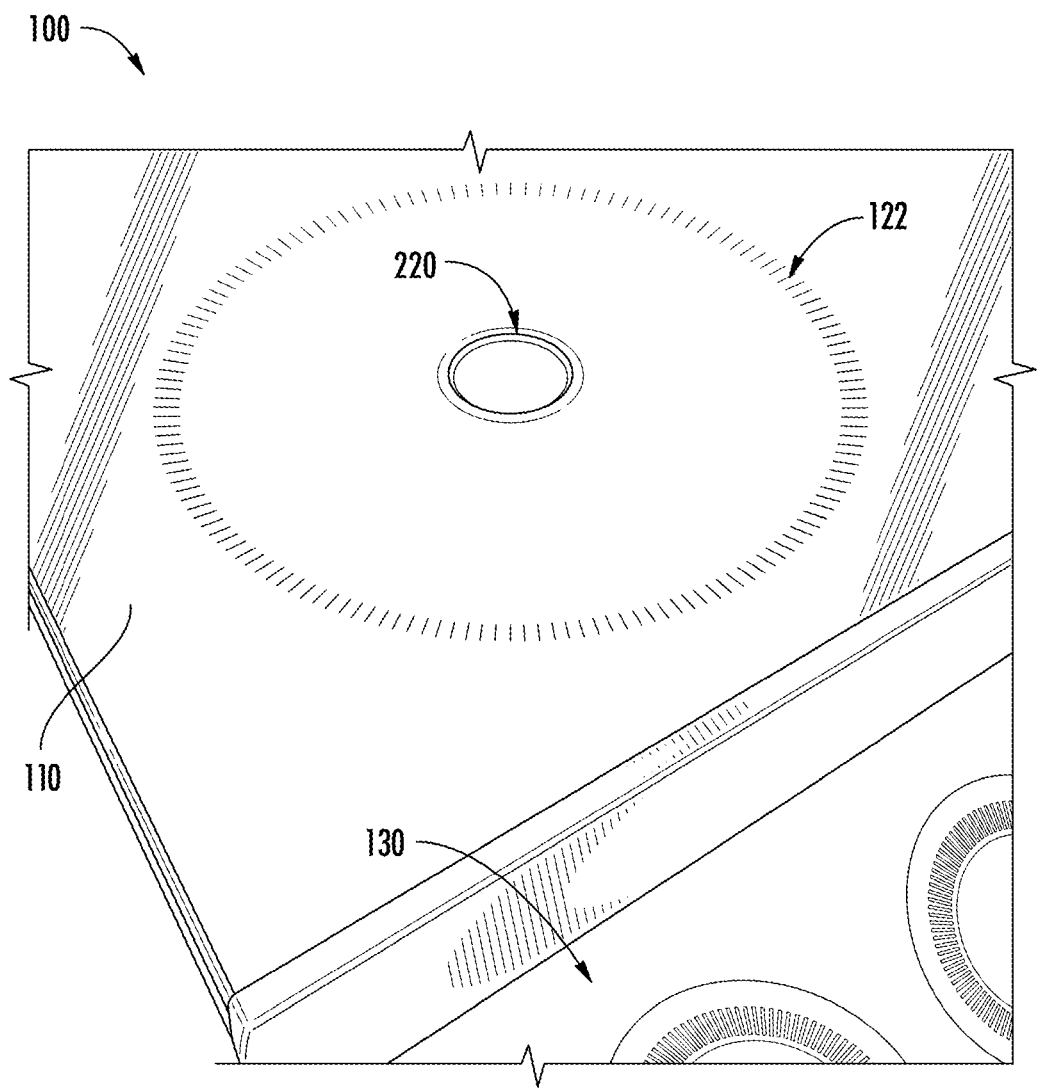
FIG. 2 provides a perspective view of a portion of the example cooktop appliance of FIG. 1.

Referring now to the figures, FIG. 1 provides a top, plan view of a cooktop appliance 100 according to an example embodiment of the present subject matter. FIG. 2 provides a perspective view of a portion of cooktop appliance 100. Cooktop appliance 100 may be installed in various locations, such as in cabinetry in a kitchen, with one or more ovens to form a range appliance, or as a standalone appliance. Thus, as used herein, the term "cooktop appliance" includes grill appliances, stove appliances, range appliances, griddle appliances, and other appliances that incorporate cooktops. One of skill in the art would appreciate aspects of the present disclosure may additionally be incorporated into other cooking appliances such as oven appliances or other suitable cooking appliances that may not include a cooktop, and that cooktop appliance 100 is provided by way of example only.

Cooktop appliance 100 includes a ceramic plate 110 for supporting cooking utensils, such as pots, skillets, woks, pans, or any other suitable cooking utensil on a cooking or top surface 114 of ceramic plate 110. Ceramic plate 110 may be any suitable ceramic or glass plate. Heating assemblies 122 are mounted below ceramic plate 110 such that heating assemblies 122 are positioned below ceramic plate 110, as would be understood in the art. Ceramic plate 110 may be continuous over heating assemblies 122. FIG. 2 depicts the sensor assembly 220 in ceramic plate 110. In the current example embodiment, sensor assembly 220 is positioned through a center of a heating assembly 122. However, it should be appreciated that in other embodiments, sensor assembly 220 may be offset from the center, such as positioned along a radius from the center. In other example embodiments, sensor assembly 220 may also be built into the cooking utensil or may be an accessory. Sensor assembly 220 may be used to detect the temperature of the cooking utensil placed thereon.

While shown with four heating assemblies 122 in the example embodiment of FIG. 1, cooktop appliance 100 may include any number of heating assemblies 122 in alternative example embodiments. Heating assemblies 122 can also have various diameters or areas. For example, each heating assembly 122 can have a different diameter, the same diameter, or any suitable combination thereof, or other surface areas. Heating assembly 122 may particularly be configured as induction heating assemblies. However, cooktop appliance 100 is provided by way of example only and is not limited to the example embodiment shown in FIG. 1. For example, a cooktop appliance having one or more heating assemblies in combination with one or more electric radiant or resistance heating elements, including a convection heater, or one or more gas burner heating elements, may be provided. In addition, various combinations of number of heating assemblies, position of heating assemblies and/or size of heating assemblies can be provided. It will also be understood that the present subject matter is suitable for use with other electric heating elements, such as induction heating elements.

Cooktop appliance 100 may be controlled by a control board or controller 140. Controller 140 may be in communication (via for example a suitable wired or wireless connection) to components of cooktop appliance 100, such as heating assembly 122. By way of example, controller 140 may include a memory and one or more processing devices such as microprocessors, CPUs or the like, such as general or special purpose microprocessors operable to execute programming instructions or micro-control code associated with operation of cooktop appliance 100. The memory may be a separate component from the processor or may be included onboard within the processor. The memory may represent random access memory such as DRAM, or read only memory such as ROM or FLASH.

A user interface 130 provides visual information to a user and allows a user to select various options for the operation of cooktop appliance 100. For example, displayed options can include a desired heating assembly 122, a desired cooking temperature, and/or other options. User interface 130 can be any type of input device and can have any configuration. In FIG. 1, user interface 130 is located within a portion of ceramic plate 110. Alternatively, user interface 130 can be positioned on a vertical surface near a front side of cooktop appliance 100 or anywhere convenient for a user to access during operation of cooktop appliance 100.

In the example embodiment shown in FIG. 1, user interface 130 includes a capacitive touch screen input device component 132. Capacitive touch screen input device component 132 may permit a user to selectively activate, adjust, or control any or all heating assemblies 122 as well as any timer features or other user adjustable inputs. Thus, the user inputs may be in communication with controller 140. A user of cooktop appliance 100 may interact with the user inputs to operate the cooktop appliance 100, and user commands may be transmitted between the user inputs and controller 140 to facilitate operation of the cooktop appliance 100 based on such user commands. One or more of a variety of electrical, mechanical, or electro-mechanical input devices including rotary dials, push buttons, toggle/rocker switches, and/or touch pads can also be used singularly or in combination with capacitive touch screen input device component 132. User interface 130 also includes a display component 134, such as a digital or analog display device designed to provide operational feedback to a user.

Heating assembly 122 of cooktop appliance 100 may be cycled between an on semi-cycle and an off semi-cycle. The power to heating assembly 122 may be cycled during a cooking operation depending on the amount of heating power, otherwise known as the power level, that is needed by the cooking operation. Generally, the power may be controlled with a predefined cycle frequency/period. During this cycle period, the ratio of the on semi-cycle time versus the total period time may be changed to produce different power levels, and the ratio may be called a duty cycle. As an example, the duty cycle may be calculated with the following % Duty Cycle=ON Time/Period*100%, wherein the "ON Time" is the amount of time the heating element, such as heating assembly 122, is active, and the "Period" is the total length of the power cycle, i.e., the sum of the on and off semi-cycle times. During closed-loop control (CLC), a user may set a desired cooking temperature, and an appliance algorithm adjusts the power level during the cooking operation based upon sensor feedback, and may further adjust the power cycle period in order to achieve the desired results. Thus, e.g., in the above example equation, the power cycle period may correspond to the "Period," which may be adjusted to change the heat output characteristics of the heating element, e.g., while maintaining a constant % Duty Cycle associated with the selected operating point for the heating element.

Figure 3:
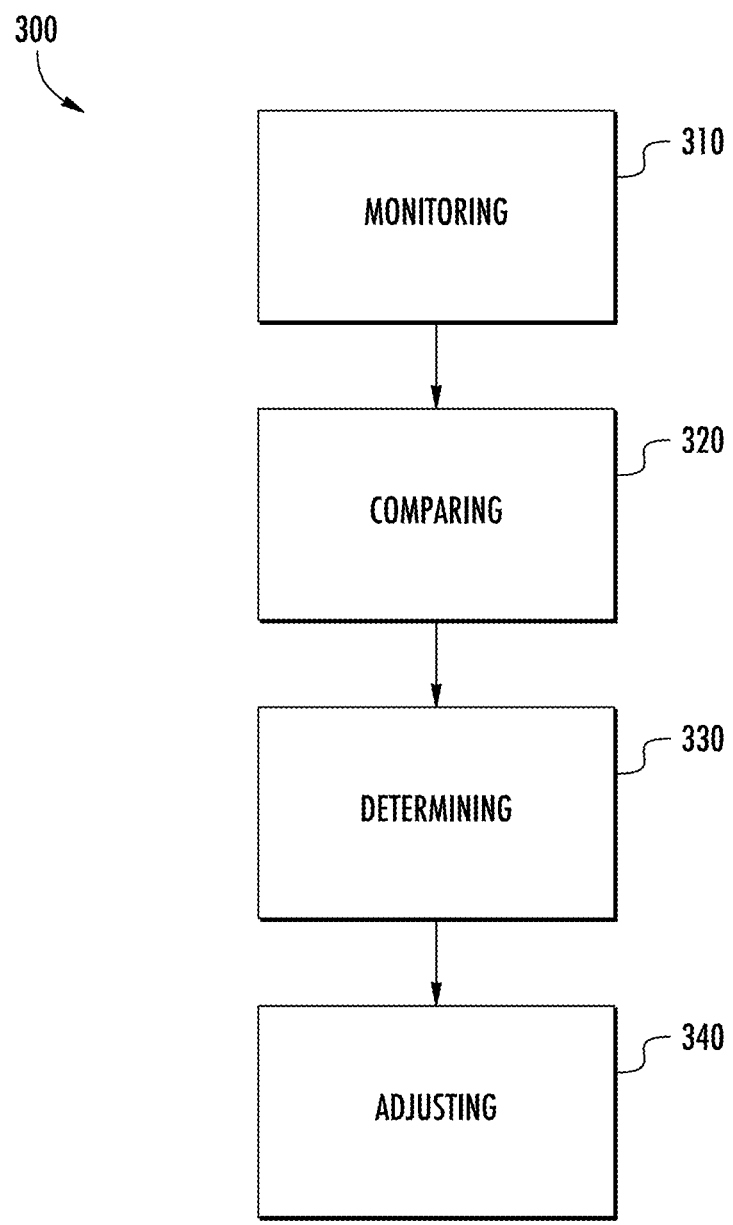
FIG. 3 illustrates a method of operating a cooktop appliance in accordance with an example embodiment of the present subject matter.

FIG. 3 provides a method 300 of controlling cooktop appliance 100. At 310, controller 140 may monitor a temperature measurement from a sensor, such as sensor assembly 220. For example, the temperature of the utensil being heated by heating assembly 122, e.g., the cooking temperature, may be one hundred degrees Celsius (100° C.) during the cooking operation. The temperature measurement from the sensor may be indicative of the cooking temperature. At 320, controller 140 may compare the temperature measurement from the sensor to a set temperature of the cooking operation. For example, the temperature of the utensil being heated by heating assembly 122 may be one hundred degrees Celsius (100° C.), and the set temperature may be one hundred degrees Celsius (100° C.). Thus, in this example, the cooking temperature has attained the desired set temperature.

At 330, controller 140 may determine a heating event, e.g., a drop in the temperature measurement from the sensor, such as sensor assembly 220. The drop may have resulted from a cooking event, i.e., adding new/additional food to the cooking utensil, and/or flipping the food in the cooking utensil. For example, the set temperature may be one hundred degrees Celsius (100° C.), and after the heating event, i.e., the drop in the temperature measurement from the sensor, the temperature of the utensil being heated by heating assembly 122 may be seventy degrees Celsius (70° C.). Additionally, or alternatively, controller 140 may identify the cooking event associated with the heating event. The cooking event may be identified by the magnitude of the temperature change, e.g., flipping a pancake may have less of a temperature impact than adding new pancake batter.

At 340, controller 140 may adjust a cycle period time in response to the heating event. The cycle period time may be acquired from a lookup table, such as table 700 in FIG. 7. FIG. 7 will be described in further detail herein. Additionally or alternatively, controller 140 may adjust the cycle period time from the lookup table with respect to the heating event in combination with recovery period parameters. The recovery period parameters may include a rate of recovery and a temperature error when the recovery period starts. The rate of recovery may be calculated using the difference in the temperature measurement over time.

Figure 4:
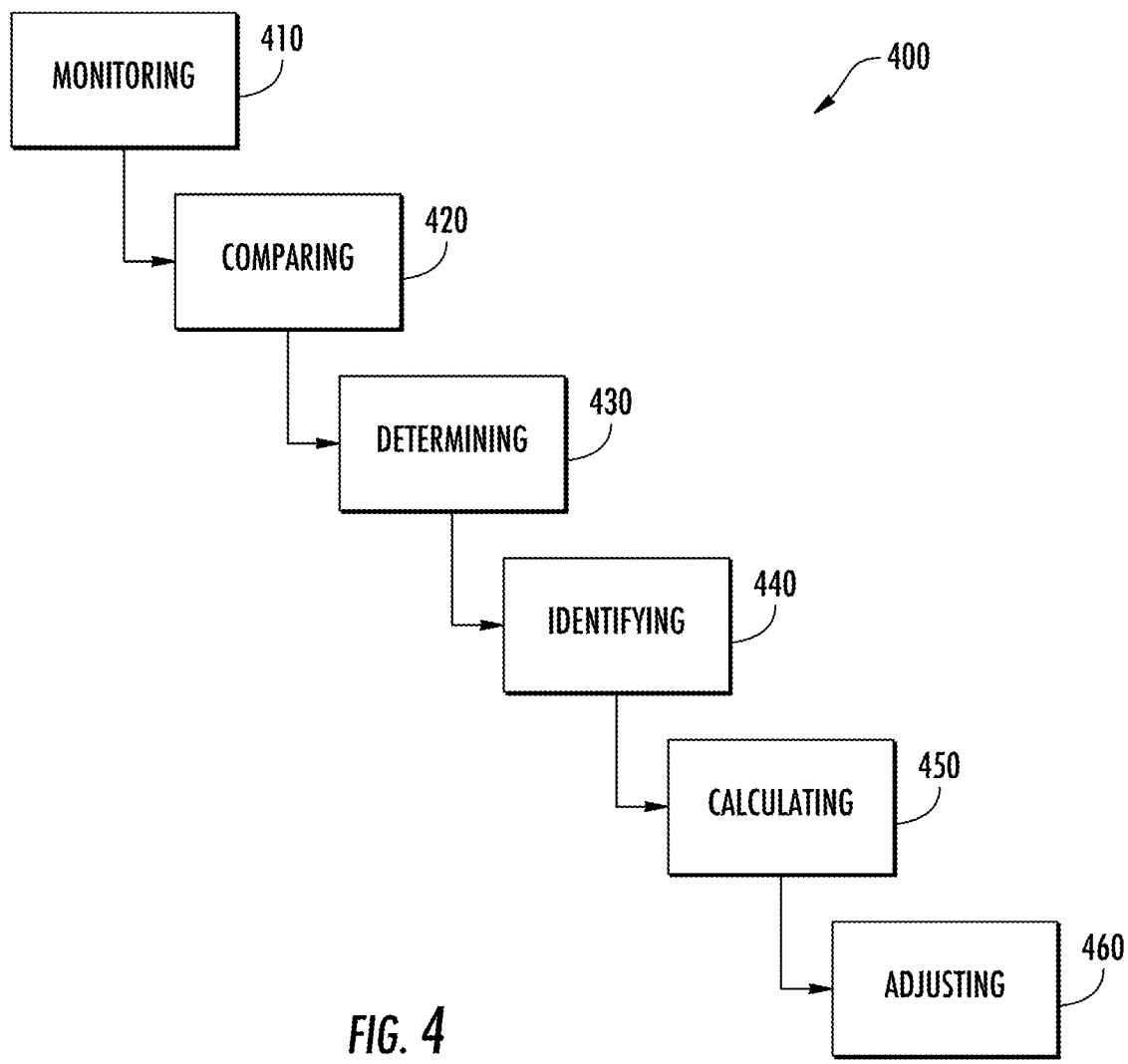
FIG. 4 illustrates a method of operating a cooktop appliance in accordance with an example embodiment of the present subject matter.

Shown in FIG. 4 is method 400, another method of controlling a cooktop appliance 100. At 410, controller 140 may monitor a temperature measurement from a sensor, such as sensor assembly 220. For example, the temperature of the utensil being heated by heating assembly 122, i.e., the cooking temperature, may be one hundred degrees Celsius (100° C.) during the cooking operation. At 420, controller 140 may compare the temperature measurement from the sensor to a set temperature of the cooking operation. For example, the temperature of the utensil being heated by heating assembly 122 may be one hundred degrees Celsius (100° C.), and the set temperature may be one hundred degrees Celsius (100° C.). Thus, in this example, the cooking temperature is at the desired set temperature.

At 430, controller 140 may determine a heating event, i.e., a drop in the temperature measurement from the sensor, such as sensor assembly 220. The heating event may have resulted from a cooking event, i.e., adding new/additional food to the cooking utensil, and flipping the food in the cooking utensil. For example, the set temperature may be one hundred degrees Celsius (100° C.), and after the heating event the temperature of the utensil being heated by heating assembly 122 may be seventy degrees Celsius (70° C.). At 440, controller 140 may identify the cooking event associated with the heating event. For example, controller 140 may identify when food or liquid is added to cookware or turned, as indicated by the heating event. As may be seen above, the cooking event may be identified by the magnitude of the temperature change, e.g., flipping a pancake may have less of a temperature impact than adding new pancake batter.

Figure 5:
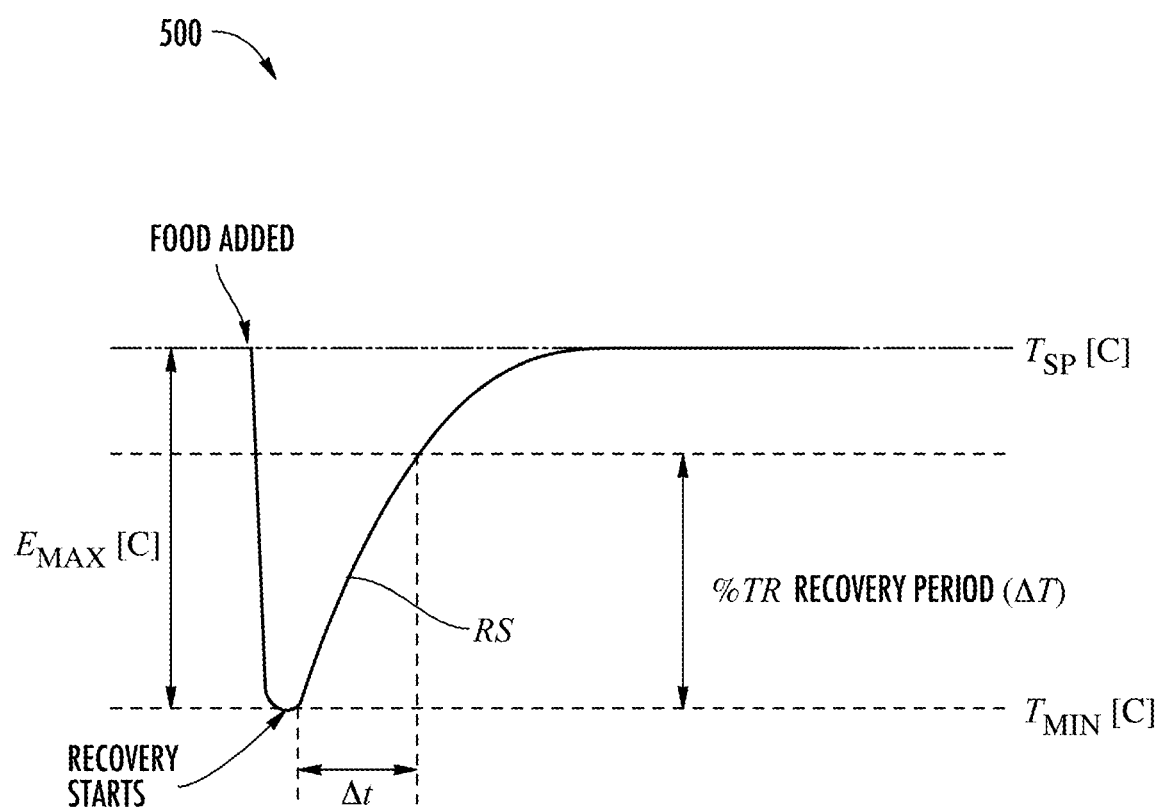
FIG. 5 is a plot of temperature versus time during the example method of FIG. 3 in accordance with an example embodiment of the present subject matter.

At 450, controller 140 may calculate recovery period parameters. Plot 500 of FIG. 5 shows an example temperature decrease when food is added or turned, and may generally show the variables for the recovery period. The recovery period may depend on the application, e.g., the recovery period may end when the temperature recovers seventy percent (70%) of the total change in temperature. The slope, or rate of change, i.e., recovery slope (RS) in FIG. 5, may be calculated as the change in temperature over the change in time. This and FIG. 5 will be described in further detail herein. The RS or rate of change of the temperature measurement during recovery may be influenced by one or any combination of the power of heating assembly 122, controller 140 gains, the temperature measurement from sensor assembly 220, the temperature error when the recovery starts, the amount of food, the type of food, and the cookware type/material. For example, with the power of heating assembly 122 and the controller 140 gains known by controller 140, the temperature measurement from the sensor and temperature error when recovery starts, along with the slope of the temperature recovery may be used to select the cycle period time. Thus, at 460, controller 140 may adjust to a cycle period time in response to the calculated recovery period parameters.

For example, method 400 may include a user inputting a set temperature and start the cooking cycle. When using a cooking utensil with a built-in temperature sensor, the user may also activate the cookware. The temperature sensor may also be part of an accessory or part of the appliance, such as sensor assembly 220. Controller 140 may energize heating assembly 122 and apply heat to the cooking utensil using a default power cycle period, typically twenty seconds (20 s). Cooktop appliance 100 may begin monitoring the temperature measurement from the sensor for a heating event, such as a large temperature decrease, indicative of the cooking event. At any point in the cooking operation the user may add food items, such as pancakes, eggs, fish, etc., to the cooking utensil. When a temperature decrease within a time window, e.g., a ten-degree Celsius (10° C.) drop in a three second (3 s) window, is observed, controller 140 may recognize this as an indication that food was added to the cooking utensil.

In certain example embodiments, food may be added at a temperature higher than the set temperature, which may cause the temperature value after food is added to be higher than the set temperature, or lower but proximate to the set temperature. This may cause the recovery slope to deviate from expected ranges and yield unreliable results. In order to filter such situations out, controller 140 may wait until the temperature stops dropping, then record the drop temperature and calculate the temperature error, as described in further detail herein. Controller 140 may determine that the temperature measurement from the sensor after food is added is at least a certain number of degrees lower than the set temperature in order to begin the calculation of the recovery period parameters, e.g., twenty degrees Celsius (20° C.) less than the set temperature. Once recovery starts, controller 140 may wait until the temperature recovers by a certain percentage, e.g., 70%, then calculate the recovery slope.

Since the rate of change during recovery may depend at least partially on the temperature measurement from the sensor and temperature error when the recovery starts, numerous variables may be considered by controller 140. Plot 500 of FIG. 5 shows a temperature decrease when food is added or turned, and the different variables/parameters that may be used by controller 140. The variables shown in FIG. 5 are defined as follows:

$T_{SP}$: Set temperature [° C.]
$T_{MIN}$: Temperature measurement after food is added/turned [° C.]
$E_{MAX}$: Temperature error after food is added/turned [° C.]
% TR: Temperature recovery percentage at which RS may be calculated [%]
RS: Recovery slope [° C./second]
ΔT: Temperature range for % TR recovery period [° C.]
Δt: Time range for % TR recovery period [seconds]

The calculation of the error may be the set temperature less the temperature measurement after food is added/turned, $E_{MAX}=T_{SP}-T_{MIN}$. Additionally, the recovery slope RS may be calculated by dividing the temperature range by the time range, RS=ΔT/Δt. The temperature recovery percentage may be calculated by dividing the difference of the current temperature, $T_{CUR}$, and the temperature measurement after food is added by the difference of the set temperature and the temperature measurement after food is added, % TR=100%* $(T_{CUR}-T_{MIN})/(T_{SP}-T_{MIN})$. As seen in FIG. 5, the food may be added to the cooking utensil on heating assembly 122, resulting in a temperature decrease from $T_{SP}$ down to $T_{MIN}$.

Figure 6:
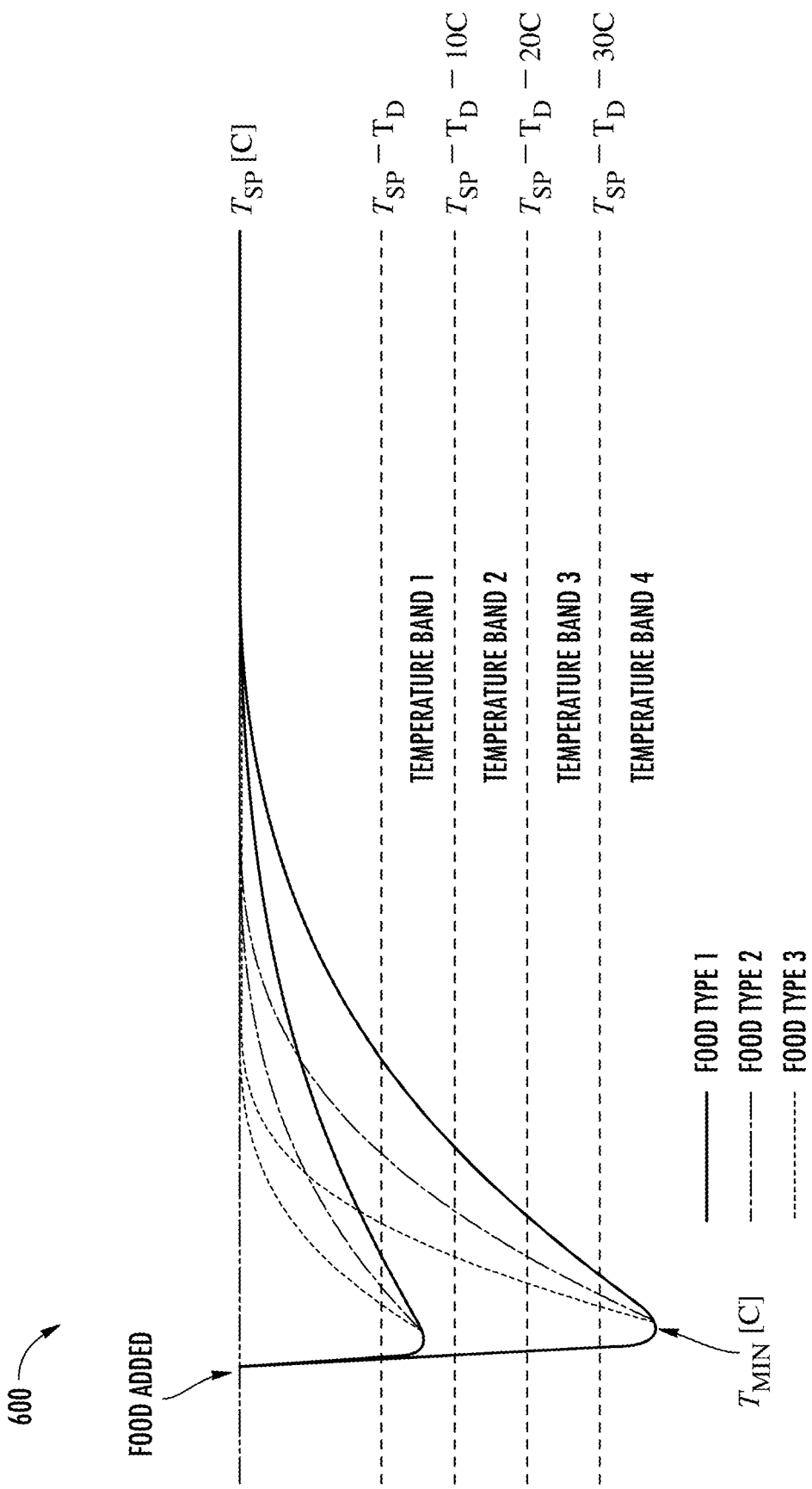
FIG. 6 is a plot of temperature versus time during the example method of FIG. 3 in accordance with an example embodiment of the present subject matter.

Demonstrated by plot 600 of FIG. 6, when food is added to the cooking utensil, the amount of temperature decrease may vary by food type, food quantity, food temperature, and cookware temperature. As previously stated, the recovery rate depends on some of these and other variables. The variables shown in FIG. 5 are defined as follows:

$T_{SP}$: Set temperature [° C.]
$T_{MIN}$: Temperature measurement after food is added/turned [° C.]
$T_D$: Minimum temperature difference required [° C.]

As seen in FIG. 6, different food types may have different recovery rates or slopes after food is added. Additionally, the recovery rate for the same food type may depend on the temperature decrease after food is added or turned. For example, a larger temperature decrease, such as the addition of food, may result in a recovery slope that is larger because the temperature error may be larger. Thus, resulting in a more aggressive response from controller 140, i.e., a higher cooking element power is applied. Additionally, controller 140 may separate food types based on thermal behavior during the recovery phase by categorizing food types based on where the recovery slope falls among several slope ranges.

Shown in FIGS. 6 through 8, several temperature bands may be set, with the first band being at least a set temperature difference, $T_D$, away from the set temperature, $T_{SP}$. The value of $T_D$ may be set in order to filter out any normal temperature fluctuations during the cooking process. Controller 140 requires $T_{SP}-T_{MIN}$ to be greater than or equal to $T_D$. In a scenario where $T_{SP}-T_{MIN}$ is smaller than $T_D$, $T_{MIN}$ will be above band 1, thus the temperature decrease may have been caused by normal temperature fluctuations and not food addition/turning. This requirement effectively may filter out normal temperature fluctuation conditions. Below $T_{SP}-T_D$, any number of additional temperature bands may be created such that each band spans any defined temperature range. When food addition/turning is detected, controller 140 may determine the temperature band that the temperature value after food is added falls in. Then controller 140 may wait for the temperature to recover by % TR (e.g., seventy percent, 70%) of the drop amount.

FIGS. 7 and 8 provide example tables of values that controller 140 may utilize for selecting the power cycle period. Tables 700 and 800 of FIGS. 7 and 8, respectively, may be stored in the memory of controller 140. Once the values of the temperature after the drop ($T_{MIN}$), the temperature error, and the recovery slope (RS) are calculated, controller 140 may use table 700 or table 800 to select and adjust the power cycle period. Table 700 may be used when the temperature after the drop ($T_{MIN}$) is not used as an input parameter, or table 800 may be used when the temperature after the drop ($T_{MIN}$) is used. Controller 140 may extract the power cycle period, from the respective table, for the current cooking conditions based on the input parameters, then replace the active power cycle period with the new power cycle period selected. Additionally, while the cooking cycle remains active, controller 140 may continue to monitor the temperature measurement for another large temperature decrease and may adjust the power cycle period again as needed. It should be understood by those of skill in the art that FIGS. 5 through 8 are provided by way of example only and that neither the shape of curves on the plots nor the values represented in the tables are limiting to the present disclosure.

In additional or alternative embodiments, cookware material selection could be included in order to fine tune the cooking parameters according to the thermal properties of the cookware. Controller 140 may be in communication with an external device that is connected to the cooking appliance and capable of sending control signals via cloud or wireless communication. The tables 700, 800 may be stored on controller 140 or on a remote server in communication with controller 140. Additional parameters could be adjusted in addition to the power cycle period, such as cooking time, controller 140 gains, and limiting temperature error while cooking. Instead of tables, controller 140 may be configured to use an equation or transfer function to calculate the power cycle period (or other parameters) based on input parameters. Controller 140 may be configured to detect food addition before the set temperature is reached.

As may be seen from the above, the present disclosure may provide a method or methods of operating an appliance in order to respond to decreases in temperature during cooking operations more appropriately than conventional methods. Controller 140 may be configured to detect food addition/turning during a cooking operation and adjust the power cycle period accordingly. Controller 140 may monitor the temperature decrease and recovery back to the set temperature, adjusting the power cycle period accordingly without requiring the user to select the specific food type/quantity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of closed loop cooking on an appliance, comprising:
monitoring, by a controller, a temperature measurement from a sensor indicative of a cooking temperature during a cooking operation;
comparing, by the controller, the temperature measurement to a set temperature of the cooking operation;
determining, by the controller, a heating event defined by the temperature measurement;
adjusting, by the controller, a cycle period time for a heating element, the cycle period time associated with the heating event, and
calculating, by the controller, recovery period parameters after the heating event for the temperature measurement to attain the set temperature, the recovery period parameters comprising one or more of a rate of recovery, a current power level of the appliance, a controller gain, the temperature measurement, a temperature error when the recovery period starts, a quantity of food, a type of food, and a material of a cooking utensil, the rate of recovery, calculated using the difference in the temperature measurement over time,
wherein the cycle period time is selected based upon the temperature error and rate of recovery.

2. The method of claim 1, wherein the cycle period time is selected from a lookup table stored in a memory of the controller.

3. The method of claim 1, further comprising identifying, by the controller, a cooking event associated with the heating event.

4. The method of claim 3, wherein the cooking event comprises one or both of adding a food item to a cooking utensil, and flipping the food item in the cooking utensil.

5. The method of claim 1, wherein the heating event comprises a temperature decrease.

6. The method of claim 1, wherein the sensor comprises a temperature sensor positioned one or more of within a cooking utensil, within a heating assembly of the appliance, and proximate the cooking utensil.

7. The method of claim 1, wherein the appliance is one of a cooktop appliance, a range appliance, or an oven appliance.

8. The method of claim 1, wherein the temperature measurement from the sensor is indicative of a temperature of a cooking utensil heated by the heating element.

9. A method of cycle period adjustment on an appliance, comprising:
monitoring, by a controller, a temperature measurement from a sensor indicative of a cooking temperature during a cooking operation;
comparing, by the controller, the temperature measurement to a set temperature of the cooking operation;
determining, by the controller, a heating event defined by the temperature measurement;
identifying, by the controller, a cooking event associated with the heating event;
calculating, by the controller, recovery period parameters after the heating event for the temperature measurement to attain the set temperature, the recovery period parameters comprising one or more of a rate of recovery, a current power level of the appliance, controller gains, the temperature measurement, a temperature error when the recovery period starts, a quantity of food, a type of food, and a material of a cooking utensil, the rate of recovery, calculated using the difference in the temperature measurement over time; and
adjusting, by the controller, a cycle period time for a heating element, the cycle period time associated with the calculated recovery period parameters.

10. The method of claim 9, wherein the cycle period time is selected from a lookup table stored in a memory of the controller.

11. The method of claim 9, wherein the cooking event comprises one or both of adding a food item to a cooking utensil, and flipping the food item in the cooking utensil.

12. The method of claim 9, wherein the heating event comprises a temperature decrease.

13. The method of claim 9, wherein the sensor comprises a temperature sensor positioned one or more of within a cooking utensil, within a heating assembly of the appliance, and proximate the cooking utensil.

14. The method of claim 13, wherein the cycle period time is selected based upon the temperature error and rate of recovery.

15. The method of claim 9, wherein the cycle period time is selected based upon a temperature measurement after the heating event.

16. The method of claim 9, wherein the temperature measurement from the sensor is indicative of a temperature of a cooking utensil heated by the heating element.

17. The method of claim 9, wherein the appliance is one of a cooktop appliance, a range appliance, or an oven appliance.

18. A method of closed loop cooking on an appliance, comprising:
monitoring, by a controller, a temperature measurement from a sensor indicative of a cooking temperature during a cooking operation;
comparing, by the controller, the temperature measurement to a set temperature of the cooking operation;
determining, by the controller, a heating event defined by the temperature measurement;
adjusting, by the controller, a cycle period time for a heating element, the cycle period time associated with the heating event, and
calculating, by the controller, recovery period parameters after the heating event for the temperature measurement to attain the set temperature, the recovery period parameters comprising one or more of a rate of recovery, a current power level of the appliance, a controller gain, the temperature measurement, a temperature error when the recovery period starts, a quantity of food, a type of food, and a material of a cooking utensil, the rate of recovery, calculated using the difference in the temperature measurement over time,
wherein the cycle period time is selected based upon a temperature measurement after the heating event.

19. The method of claim 18, wherein the cycle period time is selected from a lookup table stored in a memory of the controller.

* * * * *